United States Patent
Latheef et al.

(10) Patent No.: US 12,408,184 B2
(45) Date of Patent: Sep. 2, 2025

(54) METHODS AND SYSTEMS FOR MANAGING MULTICAST BROADCAST SERVICE (MBS) SERVICES

(71) Applicant: Samsung Electronics Co., Ltd., Suwon-si (KR)

(72) Inventors: Fasil Abdul Latheef, Bangalore (IN); Vinay Kumar Shrivastava, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 18/040,395

(22) PCT Filed: Aug. 6, 2021

(86) PCT No.: PCT/KR2021/010412
§ 371 (c)(1),
(2) Date: Feb. 2, 2023

(87) PCT Pub. No.: WO2022/031109
PCT Pub. Date: Feb. 10, 2022

(65) Prior Publication Data
US 2023/0276471 A1    Aug. 31, 2023

(30) Foreign Application Priority Data

Aug. 6, 2020  (IN) .............................. 202041033736
Jul. 29, 2021  (IN) .............................. 202041033736

(51) Int. Cl.
H04W 28/02    (2009.01)
H04W 72/30    (2023.01)

(52) U.S. Cl.
CPC .................................. H04W 72/30 (2023.01)

(58) Field of Classification Search
CPC ..... H04W 76/27; H04W 72/14; H04W 18/12; H04W 76/28; H04W 24/08; H04W 72/23;
(Continued)

(56) References Cited

U.S. PATENT DOCUMENTS

2017/0273057 A1    9/2017  Lee et al.
2017/0290014 A1    10/2017  Kim et al.
(Continued)

FOREIGN PATENT DOCUMENTS

WO    2020035129 A1    2/2020

OTHER PUBLICATIONS

International Search Report and Written Opinion of the International Searching Authority dated Nov. 3, 2021, in connection with International Application No. PCT/KR2021/010412, 8 pages.
(Continued)

*Primary Examiner* — Phuoc H Doan

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method disclosed herein includes using a hierarchical signalling to provide one or more MBS services to a User Equipment (UE), wherein an MBS System Information Block (SIB) is used to signal MBS control channel (MCCH) information, and a MCCH message is used to signal the MBS traffic channel (MTCH) information.

15 Claims, 6 Drawing Sheets

(58) Field of Classification Search
CPC .. H04W 68/005; H04L 5/0051; H04L 5/0053; H04B 1/3838
See application file for complete search history.

(56) References Cited

U.S. PATENT DOCUMENTS

| | | | |
|---|---|---|---|
| 2017/0332213 | A1 | 11/2017 | Xu et al. |
| 2020/0170022 | A1 | 5/2020 | Jones |
| 2020/0260487 | A1* | 8/2020 | Bhattad ............. H04W 74/0808 |
| 2021/0168569 | A1 | 6/2021 | Ayaz et al. |
| 2022/0109597 | A1* | 4/2022 | Takeda .................. H04L 1/0038 |

OTHER PUBLICATIONS

Examination report dated Aug. 12, 2022, in connection with Indian Application No. 202041033736, 6 pages.

* cited by examiner

METHODS AND SYSTEMS FOR MANAGING MULTICAST BROADCAST SERVICE (MBS) SERVICES

CROSS-REFERENCE TO RELATED APPLICATIONS

This application is a 371 National Stage of International Application No. PCT/KR2021/010412, filed Aug. 6, 2021, which claims priority to Indian Patent Application No. 202041033736, filed Aug. 6, 2020, and Indian Patent Application No. 202041033736, filed Jul. 29, 2021, the disclosures of which are herein incorporated by reference in their entirety.

BACKGROUND

1. Field

The present disclosure relates to the field of wireless networks and more particularly to managing Multicast Broadcast Service (MBS) services.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Multicast and Broadcast (MBS) services are primarily point-to-multipoint services, wherein data packets have been transmitted to a plurality of recipients/User Equipments (UEs) simultaneously. MBS control information/MBS control channel (MCCH) information have to be signalled to the UEs for reception of the one or more MBS services. In a Long-Term Evolution (LTE) network, a hierarchical approach has been followed to signal the MBS control information to the UEs. The hierarchical approach includes providing system information to the UEs, which carries configurations required to receive the MBS control information, which further carries signalling and configuration required to receive the one or more MBS services over an MBS traffic channel (MTCH). In a New Radio (NR) network, two approaches have been used to signal the MBS control information to the UEs. A first approach involves hierarchical signaling structure. A second approach involves a flat signalling structure, wherein all the configurations required to receive the one or more MBS services are broadcasted in a single broadcast message. However, the flat signalling structure may be associated with the signalling overhead.

SUMMARY

The principal object of the embodiments herein is to disclose methods and systems for managing Multicast Broadcast Service (MBS) services.

Another object of the embodiments herein is to disclose methods and systems for using a hierarchical signaling approach to provide one or more MBS services to a User Equipment (UE), wherein an MBS System Information Block (SIB) is used to signal configuration information of an MBS control channel (MCCH) message, and the MCCH message is used to signal MBS traffic channel (MTCH) information.

Another object of the embodiments herein is to disclose methods and systems for providing different MBS control information to the UE using a plurality of MCCHs.

Another object of the embodiments herein is to disclose methods and systems for providing the UE with the MBS control and configuration information corresponding to the one or more MBS services configured for an applicable Radio Resource Control (RRC) state of the UE.

Another object of the embodiments herein is to disclose methods and systems for dividing a transmission frequency resource of the one or more MBS services into a plurality of bandwidth parts (BWPs)/Common Frequency Resources (CFRs) and utilizing a few BWPs/CFRs to provide the one or more MBS services to the UE.

Another object of the embodiments herein is to disclose methods and systems for managing a group scheduling of the plurality of MBS services.

Another object of the embodiments herein is to disclose methods and systems for providing Discontinuous Reception (DRX) configurations to the UE in the MCCH message.

Another object of the embodiments herein is to disclose methods and systems for varying a transmission area for the one or more MBS services across a cell.

Accordingly, the embodiments herein provide methods and systems for managing Multicast Broadcast Service (MBS) services. A method disclosed herein includes receiving, by a User Equipment (UE), a first message broadcasted by a Base Station (BS), wherein the first message includes scheduling information of a second message. The method includes receiving, by the UE, the second message broadcasted by the BS based on the scheduling information in the first message, wherein the second message includes configuration information of a third message. The method includes receiving, by the UE, the third message broadcasted by the BS over at least one MBS control channel (MCCH) based on the configuration information in the second message, wherein the third message includes MBS control and configuration information of at least one MBS service. The method includes receiving, by the UE, a fourth message including the at least one MBS service broadcasted by the BS over at least one MBS traffic channel (MTCH) based on the MBS control and configuration information in the third message, wherein each of the at least one MBS service varies with latency and reliability requirements.

Accordingly, the embodiments herein provide a User Equipment (UE) for managing Multicast Broadcast Service (MBS) services. The UE is configured to receive a first message broadcasted by a Base Station (BS), wherein the first message includes scheduling information of a second message. The UE is configured to receive the second message broadcasted by the BS based on the scheduling information in the first message, wherein the second message includes configuration information of a third message. The UE is configured to receive the third message broadcasted by the BS over at least one MBS control channel (MCCH) based on the configuration information in the second message, wherein the third message includes MBS control and configuration information of at least one MBS service. The UE is configured to receive a fourth message including the at least one MBS service broadcasted by the BS over at least one MBS traffic channel (MTCH) based on the MBS control and configuration information in the third message, wherein each of the at least one MBS service varies with latency and reliability requirements.

Accordingly, embodiments herein disclose a Base Station (BS) in a Multicast Broadcast Service (MBS) communication system. The BS is configured to broadcast a first message with a scheduling information of a second message to the plurality of UEs for receiving the second message, wherein the first message is a system information block 1 (SIB1) and the second message is an MBS SIB. The BS is configured to broadcast the second message with control information of a third message to the plurality of UEs for receiving the third message, wherein the third message includes an MBS control and configuration information. The BS is configured to broadcast the third message to the plurality of UEs over at least one MCCH for receiving a fourth message, wherein the fourth message is an MBS traffic channel (MTCH) message comprising the at least one MBS service. The BS is configured to broadcast the fourth message including the at least one MBS service to the plurality of UEs over at least one MTCH.

Accordingly, embodiments herein disclose a Multicast Broadcast Service (MBS) communication system comprising a plurality of User Equipments (UEs), and a Base Station (BS). The BS is configured to broadcast a first message including scheduling information of a second message to the plurality of UEs, wherein the first message is a System Information Block 1 (SIB1) and the second message is an MBS SIB. The UE is configured to receive the first message from the BS. The BS is configured to broadcast the second message including configuration information of a third message to the plurality of UEs. The UE is configured to receive the second message from the BS based on the scheduling information in the first message. The BS is configured to broadcast the third message including MBS control and configuration information of at least one MBS service to the plurality of UEs. The UE is configured to receive the third message from the BS over at least one MBS control channel (MCCH) based on the configuration information in the second message. The BS is configured to the BS is configured to broadcast a fourth message including the at least one MBS service to the plurality of UEs. The UE is configured to receive the fourth message including the at least one MBS service over at least one MBS traffic channel (MTCH) based on the MBS control and configuration information in the third message, wherein each of the at least one MBS service varies with latency and reliability requirements.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

According to an embodiment of present disclosure a method and a system for managing Multicast Broadcast Service (MBS) services in a NR wireless network is provided.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
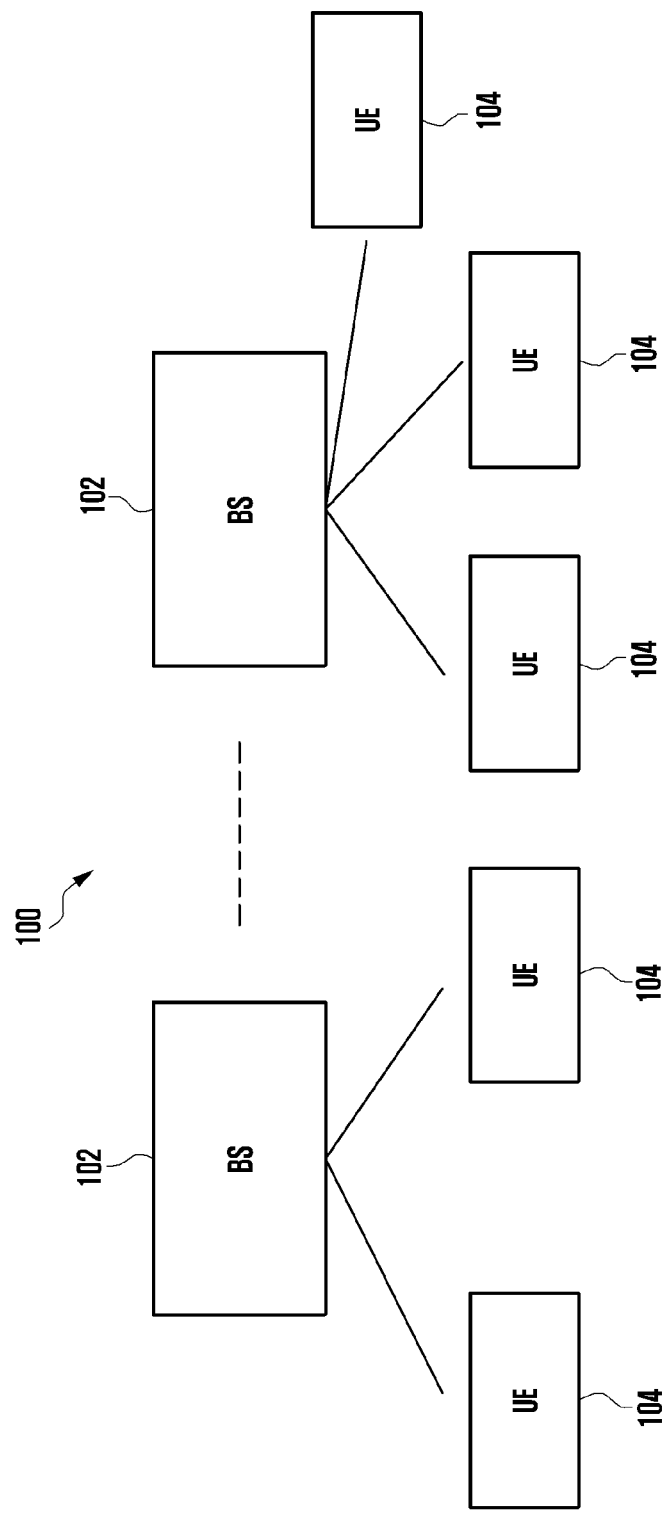
FIG. 1 is a Multicast Broadcast Service (MBS) communication system, according to embodiments as disclosed herein.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for managing Multicast Broadcast Service (MBS) services.

Referring now to the drawings, and more particularly to FIGS. 1 through 6, where similar reference characters denote corresponding features consistently throughout the figures, there are shown example embodiments.

FIG. 1 is a Multicast Broadcast Service (MBS) communication system 200, according to embodiments as disclosed herein. The MBS communication system 200 referred herein may be configured to provide MBS services to a plurality of recipients. In an embodiment, the MBS services include one of, a point-to-multipoint (PTM) service, a point-to-point (PTP) service/unicast service, and a combination of the PTM service and the PTP service. The PTM services may be one of, broadcast services, and multicast services. The above-described types/forms of the MBS services may be intuitively inferred by one of ordinary skill in the art by referring to the 3GPP specification, and thus, its detailed description is omitted.

Examples of the MBS services may be, but are not limited to, a streaming service (streaming of multimedia data such as audio, video, text and so on), a file download service, a carousel service (combining file download service and streaming service), a television (TV) service, and so on. The MBS services may be used to support a wide variety of applications such as, but are not limited to, public safety and mission critical applications, Vehicle to Everything (V2X) application, Internet Protocol (IP)v4/IPv6 multicast delivery applications, Internet Protocol television (IPTV) software delivery applications, group communication related applications, Internet of Things (IoT) applications or any other applications which have different Quality of Service (QoS) requirements and categorized as critical and non-critical services.

The MBS communication system 100 includes a plurality of Base Stations 102, and a plurality of User Equipments (UEs) 104.

The BS(s) 102 may be a radio node configured to communicate with the one or more UEs 104. The BS 102 may communicate with the one or more UEs 104 via a same or different Radio Access Technologies (RATs). Examples of the RATs may be, but are not limited to, a Third Generation Partnership 3rd Generation Partnership Project (3GPP) Long Term Evolution (LTE/4G), an LTE-Advanced (LTE-A), a Fifth Generation (5G) New Radio, a 6G wireless system, a Wireless Local Area Network (WLAN), a Worldwide Interoperability for Microwave Access (WiMAX/IEEE 802.16), a Wi-Fi (IEEE 802.11), an Evolved-UTRA (E-UTRA), or any other next generation network. The BS 102 provides at least one cell to the UEs 104, wherein the at least one cell indicates a geographical area in which services (the MBS services herein) may be offered to the UEs 104. The BS 102 may be at least one of, a macro-BS, a micro-BS, a femto-BS, a pico-BS, and so on. Embodiments herein use the terms such as "BSs", "cells", "macro-BSs", "pico-BSs", "eNodeBs (eNBs)", "gNBs", and so on, interchangeably to refer to a Base Transceiver System (BTS)/station that communicates with the one or more UEs 204.

The BS 102 may be configured to serve the one or more UEs 104 with the MBS services, which have been received from an MBS gateway/server (not shown).

The UE(s) 104 referred herein may be a user device supporting reception of the MBS services. Examples of the UE 104 may be, but are not limited to, a terminal, a mobile phone, a smartphone, a tablet, a phablet, a personal digital assistant (PDA), a laptop, a computer, a wearable computing device, a vehicle infotainment device, an Internet of Things (IoT) device, a Wireless Fidelity (Wi-Fi) router, a USB dongle, a television, a vehicle with communication facility (for example; a connected car), or any other processing device supporting the MBS services.

The UE 104 may operate in various Radio Resource Control (RRC) states such as, but are not limited to, an RRC Connected state, an RRC Idle state, an RRC Inactive state, and so on. Each RRC state of the UE 104 may be intuitively inferred by one of ordinary skill in the art by referring to the 3GPP specification, and thus, its detailed description is omitted.

Embodiments herein manage signalling of control information required for reception of the one or more MBS services on the UEs 104.

The BS 102 broadcasts a first message to a plurality of UEs 104. The first message includes a scheduling information of a second message. In an embodiment, the first message is a System Information Block 1 (SIB1). In an embodiment, the second message is an MBS SIB. In another embodiment, the second message is an extended SIB1. The UE 104 in the plurality of UEs 104 receives the first message.

On broadcasting the first message, the BS 102 broadcasts the second message to the plurality of UEs 104. The second message (the MBS SIB or the extended SIB1) includes configuration information of a third message. The configuration information in the second message includes scheduling configurations of the third message such as, but are not limited to, a modification period, a repetition period, an offset, a first slot, a duration in number of slots and so on. The third message is an MBS control channel (MCCH) message, which includes MBS control and configuration information corresponding to the one or more MBS services. The MBS control and configuration information includes at least one of, but is not limited to, a bearer configuration for the MBS services, layers configuration (for example, a Packet Data Convergence Protocol (PDCP) configuration, a Radio Link Control (RLC) configuration, Medium Access Control (MAC) configuration, or the like), a group Radio Network Temporary Identifier (G-RNTI), Discontinuous Reception (DRX) scheduling configurations, a Temporary Mobile Group Identifier (TMGI), an MBS session identity for the MBS services, and so on. In an embodiment, the third message may be used for mapping MBS control messages received over a Physical Downlink Shared Channel (PDSCH). Embodiments herein use the terms "third message", "MBS control and configuration information", "multicast control channel" "MBS control and configuration information message", "MBS control information", "multicast control information", "MCCH configurations", "MCCH control information", "MCCH", and so on, interchangeably to refer to control information required for the reception of the one or more MBS services. The UE 104 receives the second message based on the scheduling information in the first message.

On broadcasting the second message, the BS 102 broadcasts the third message. The fourth message is an MBS traffic channel (MTCH) message comprising the one or more MBS services/traffic. In an embodiment, the fourth message may be used for mapping MBS traffic messages received over the PDSCH. The fourth message includes at least one of, but is not limited to, the bearer configuration for the MBS services, the layers configurations (for example, PDCP configurations, RLC configurations, MAC configurations, or the like), the G-RNTI, the DRX scheduling configurations, the TMGI and/or the MBS session identity for the MBS services, and so on. Embodiments herein use the terms such as, "fourth message", "MTCH message, "MBS traffic information", "MTCH configurations", "multicast traffic information", the MBS services/traffic", and so on, interchangeably to refer to actual MBS traffic information/MBS services. The UE 104 receives the third message from the BS 102 over the one or more MCCHs, based on the configuration information present in the second message. In an embodiment, the one or more MCCHs may have different configuration parameters such as, but are not limited to, a repetition period, a modification period, a first slot, a duration, a Bandwidth Part (BWP), a Common Frequency Resource (CFR), Discontinuous Reception (DRX) configurations, a Radio Network Temporary Identifier (RNTI), a beamforming configuration, a modulation and coding scheme, and so on.

On broadcasting the third message, the BS 102 broadcasts the fourth message to the plurality of UEs 104. The fourth message includes the one or more MBS services. The UE 104 receives the one or more MBS services over the one or more MTCHs, based on the MBS control and configuration information present in the third message. In an embodiment, the one or more MBS services may vary with latency and reliability requirements.

Thus, a hierarchical signaling approach may be used to provide the one or more MBS services to the UE 104, wherein the MBS SIB is used to signal the configuration information for the MCCH, and the third message/MCCH message is used to signal the MBS control and configuration information, instead of signaling the MBS control information and the MBS traffic information over the existing PDSCH.

Embodiments herein employ a plurality of MCCHs to provide the different MBS control and configuration information to the UE 104.

The BS 102 maps the plurality of different MBS services to the plurality of different MCCHs, based on the latency and reliability requirements of each of the plurality of MBS services. The BS 102 broadcasts the different MBS control and configuration information corresponding to the plurality of MBS services to the UE 104 over the mapped plurality of different MCCHs.

The UE 104 receives the different MBS control and configuration information corresponding to the plurality of different MBS services over the respective plurality of different MCCHs. The UE 104 uses the received different MBS control and configuration information to receive the plurality of different MBS services over the one or more MTCHs.

Embodiments herein provide the one or more MBS services to the UE 104 based on a current RRC state of the UE 104.

The BS 102 configures an applicable RRC state of the UE 104 for each of the one or more MBS services. In an embodiment, the BS 102 configures a specific or all the RRC states of the UE 104 for the one or more MBS services, which are the broadcast services. In another embodiment, the BS 102 configures the specific or all the RRC stares of the UE 104 for the MBS services, which are the multicast services. In another embodiment, the BS 102 configures one of, the RRC Idle state and the RRC Inactive state of the UE 104 with the one or more MBS services, which are multicast services.

The BS 102 may determine configuring the applicable RRC state of the UE 104 with each of the one or more MBS services. In an example, the BS 102 may determine configuring the applicable RRC state of the UE 104 with each of the one or more MBS services, based on service characteristics such as, but are not limited to, latency and reliability requirements, or the like. Alternatively, the BS 102 configures the applicable state of the UE 104 for each of the one or more MBS services based on a network implementation. In an example, the BS 102 may configure the RRC Idle/Inactive state of the UE 104 with EN-TV (Enhanced Television) services (an example application supported by the MBS services), which have been efficiently received in the RRC Idle/Inactive state of the UE 104. In another example, the BS 102 may configure the RRC Connected state of the UE 104 with V2X services (an example application supported by the MBS services), which have been efficiently received in the RRC Connected state of the UE 104. In order to receive the MBS services that have been configured with the RRC Idle/Inactive state, the respective MBS control and configuration information has to be broadcasted in the cell to the UE 104. However, in order to receive the MBS services that have been configured only with the RRC Connected state, the respective MBS control and configuration information may be signalled to the UE 104 in the RRC Connected state in addition to broadcasting in the cell.

The BS 102 reserves availability of the one or more MBS services configured for the specific RRC state of the UE 104. In an example, the BS 102 reserves the availability of the one or more MBS services for the UE 104 for the RRC Connected state based on the latency and reliability requirements, need for an acknowledged mode of operation of MBS service, or the like associated with the one or more MBS services. In another example, the BS 102 reserves the availability of the one or more MBS services for the UE 104, for the RRC Idle/Inactive state based on the reliability requirements of the one or more MBS services.

The BS 102 provides the UE 104 with the MBS control and configuration information corresponding to the one or more MBS services reserved for the UE 104. In an example, the BS 102 provides MBS configuration information corresponding to the reserved one or more MBS services to the UE 104 in at least one of, but is not limited to, an RRC signalling, a unicast signaling, or the like, when the UE 104 is the RRC Connected state. In another example, the BS 102 provides the MBS control and configuration information corresponding to the reserved one or more MBS services to the UE 104 in at least one of, but is not limited to, the MCCH message, or the like, when the UE 104 is the RRC Idle/Inactive state. In another example, the BS 102 provides the MBS control and configuration information corresponding to the multicast services to the UE 104 in at least one of, but is not limited to, the SIB1, the MBS SIB, the one or more MCCHs, and so on, when the UE 104 is in the RRC Idle/Inactive state.

The UE 104 receives the MBS control and configuration information corresponding to the one or more MBS services, according to the current RRC state. In an example, the UE 104 determines the reserved availability of the one or more MBS services for the RRC Connected state based on the latency and reliability requirements, need for an acknowledged mode of operation of MBS service, or the like associated with the one or more MBS services, when the UE 104 is in the RRC Connected State. The UE 104 receives the MBS control and configuration information corresponding to the reserved one or more MBS services from the BS 102 in the RRC Connected state through the RRC signalling, the unicast signaling, or the like. In another example, the UE 104 determines the reserved availability of the one or more MBS services for the RRC Idle state or the RRC Inactive state based on the reliability requirements of the one or more MBS services, when the UE 104 is in the RRC Idle state or the RRC Inactive state. The UE 104 receives the MBS control and configuration information corresponding to the reserved one or more MBS services from the BS 102 in the RRC Idle state or the RRC Inactive state through the MCCH. The UE 104 uses the received MBS control and configuration information to receive the respective one or more MBS services, configured for the current RRC state.

Embodiments herein provide the one or more MBS services to the UE 104 by managing resource allocation.

The BS 102 divides a transmission frequency resource of the one or more MBS services into at least one of, a plurality of bandwidth parts (BWPs) and Common Frequency Resources (CFRs).

The BS 102 provides the one or more MBS services to the UE 104 using at least one of, the plurality of BWPs and the CFRs. The one or more MBS services may be supported per carrier or per BWP. In an embodiment, the BS 102 provides the same MBS service supported by the one or more BWPs/CRFs to the UE 104. Alternatively, the BS 102 provides the different MBS services supported by the plurality of different BWPs to the UE 104. In another embodiment, the BS 102 dynamically allocates Physical Resource Blocks over at least one of, a BWP from the plurality of BWPs, and a CFR from the plurality of CFRs to provide the one or more MBS services to the UE 104 at each scheduling occasion using a Physical Downlink Control Channel (PDCCH). The BS 102 allocates the PRBs on the PDSCH.

The UE 104 receives the one or more MBS services from the BS 102, which have been supported by the one or more BWPs/CFRs.

Embodiments herein disclose performing a flexible resource allocation between the unicast and the broadcast/multicast services. Therefore, most cells/BSs 102 may support the unicast services in addition to the multicast services.

For ease of scheduling the one or more MBS services, the BS 102 deploys the MBS services only in a subset of the carrier bandwidth and not across the entire carrier bandwidth (i.e., using only a few BWPs in the cell that support the MBS services while other BWPs support only the unicast services). Since the BWPs are associated with a subcarrier spacing (SCS) and the different MBS services may require different SCS, it may be feasible that the MBS services across the different MBS supported BWPs within the cell may be different.

Embodiments herein manage a group scheduling of the plurality of MBS services.

The BS 102 groups the plurality of MBS services into one or more groups. The BS 102 configures a group scheduling for each of the groups. Examples of the group scheduling may be, but are not limited to, a dynamic scheduling, a Group-Configured Scheduling-Radio Network Temporary Identifier (G-CS-RNTI) and/or Configured Scheduling-Radio Network Temporary Identifier (CS-RNTI) based Semi-Persistent Scheduling (SPS), and so on.

On configuring the group scheduling for each group, the BS 102 identifies the group scheduling configured for each group using an identifier. Examples of the identifier may be, but are not limited to, a Group-Radio Network Temporary Identifier (G-RNTI), a Cell-Radio Network Temporary Identifier (C-RNTI), CS-RNTI, G-CS-RNTI, and so on. The BS 102 uses the identifier for identifying the group scheduling configured for each group based on parameters such as, but are not limited to, a usage of a group common control channel, a UE specific control channel, and so on. In an example, the dynamic scheduling scheduled for the one or more MBS services may be identified using the G-RNTI. In another example, the SPS scheduled for the one or more MBS services may be identified using the G-CS-RNTI.

The UE 104 receives signaling from the BS 102 on the group scheduling of the plurality of MBS services. The UE 104 indicates the plurality of MBS services and the associated scheduling supported by the UE 104 to the BS 102. The UE 104 receives configuration including the group scheduling configured by the BS 102 for each group of MBS services. The UE 104 identifies the group scheduling configured for each group using the identifier. In an example, a number of SPS MBS services (i.e., the MBS services scheduled with the SPS) supported simultaneously is determined by the UE capability and the UE 104 indicates the number of supported SPS MBS services to the BS 102 through at least one of a UE capability information message, a UE assistance information message, and an MBS interest indication message. Further, the BS 102 configures the UE 104 with a configuration of the SPS MBS services (referred hereinafter as SPS MBS services configuration) through at least one of an RRC reconfiguration message and the MCCH message. The SPS MBS services configuration may include at least one of, but is not limited to periodicity, a number of Hybrid automatic repeat request (HARM) processes, a PDSCH aggregation factor which is the number of repetitions of SPS MBS PDSCH, a BWP, a G-CS-RNTI, a modulation and coding scheme table, and so on. The SPS MBS configuration may be indicated with an index, for example, an MBS-SPS-ConfigIndex. The UE 104 determines the specific SPS MBS service from the corresponding G-CS-RNTI.

Embodiments herein further provide the DRX configurations to the UE 104 over the one or more MCCHs. The DRX configurations depict a DRX cycle for the UE 104, which depicts an ON duration and an OFF duration of the UE 104 for receiving the one or more MBS services. The DRX configurations provide flexibility for the BS 102 to schedule the MBS services/sessions during any Transmission Time Interval (TTI) or a slot within an ON duration of the corresponding DRX cycle.

The BS 102 pre-defines the DRX configurations for the UE 104 in a specification. The specification can be 3GPP standards specification which can list out the DRX configurations and associated indices to each of the DRX configuration. The BS 102 sends the MCCH message to the UE 104 over the one or more MCCHs indicating the DRX configurations. The MCCH message includes a list of MBS services, and each service is related to an index of each of the pre-defined DRX configurations. By relating to the pre-defined DRX configurations in the specification, the UE 104 determines the detailed DRX configuration corresponding to the received index for each MBS service in the MCCH.

Alternatively, the BS 102 groups the plurality of MBS services into the one or more groups and associates the DRX configurations for each group of MBS services. The BS 102 indicates the UE 104 about the DRX configurations associated with each group of MBS services in the MCCH message over the at least one MCCH.

The UE 104 receives the DRX configurations from the BS 102 in the MCCH message over the one or more MCCHs. The UE 104 turns ON for receiving the one or more MBS services based on the received DRX configurations.

In an embodiment, the BS 102 may use the SPS for scheduling of the one or more MBS services. In an example, the BS 102 may provide the SPS for the scheduling of example MBS services like IoT applications, which may be periodic and light in nature for the data traffic. In an embodiment, the MBS specific SPS on the PDSCH is supported for the scheduling of the multicast services.

In an example, the BS 102 may use the SPS for scheduling of the one or more MBS services instead of using the DRX configurations of the one or more MBS services. In another example, the BS 102 may use the SPS scheduling of the one or more MBS services in conjunction with the DRX configurations of the one or more MBS services, which further reduces load on the PDCCH. In another example, the SPS MBS services (i.e., the SPS scheduled MBS services) may be activated and deactivated through the PDCCH. When the SPS MBS service is activated, the UE 104 stores a downlink assignment as a configured downlink assignment. While, when the SPS MBS service is deactivated, the UE 104 clears the configured downlink assignment and/or indicate an acknowledgement to the BS 102.

Embodiments herein vary a transmission area for the one or more MBS services. Embodiments herein provide enhancements to support dynamic control of an MBS or a Broadcast/Multicast transmission area (hereinafter referred as a transmission area). Based on the type of the MBS services, the transmission area for the MBS services may vary. For example, the MBS services used in the applications such as public safety applications, V2X applications, or the like, may be limited to a small area within the cell, and the MBS services used in the applications such as, IPTV applications, group communications, or the like may span across the multiple cells. The UE 104, which receives such kind of MBS services may move over to area that are not part of the current transmission area, or the UE 104 (or a number of UEs) outside of the current transmission area may be interested in receiving such MBS services. In such scenarios, the BS 102 dynamically varies the transmission area for the MBS services. In an example herein, the transmission area of the MBS service may be small and limited to a set of beams, or large and spanning across multiple cells within the BS 102. In another example herein, the different MBS services supported in the cell may have the different transmission areas.

The BS 102 varies the transmission area for the MBS services across the cell based on factors such as, but are not limited to, a type, a nature, and service requirements of the one or more MBS services, an input received from the UE 104 depicting the one or more MBS services the UE 104 is interested in, and so on. The transmission area includes one of, a single beam, a plurality of beams, a single cell, a plurality of cells, or the like. The BS 102 indicates the transmission area for the one or more MBS services to the UE through at least one of the SIB1, the MBS SIB, a new SIB, the MCCH, and a dedicated RRC signaling message.

FIG. 1 shows exemplary elements of the MBS communication system 100, but it is to be understood that other embodiments are not limited thereon. In other embodiments, the MBS communication system 100 may include less or a greater number of elements/units. Further, the labels or names of the units are used only for illustrative purpose and does not limit the scope of the embodiments herein. One or more units can be combined together to perform same or substantially similar function in the MBS communication system 100.

Figure 2:
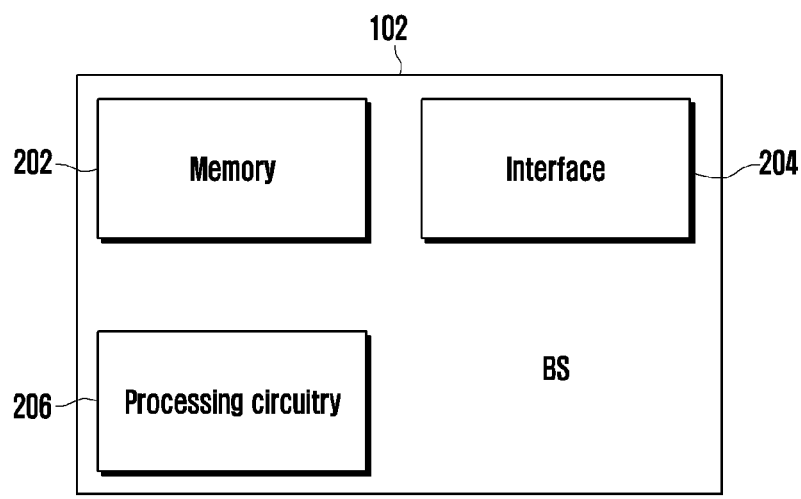
FIG. 2 is an example block diagram depicting components of a Base Station (BS) in the MBS communication system for managing broadcasting of the one or more MBS services to the UEs, according to embodiments as disclosed herein.

FIG. 2 is an example block diagram depicting components of the base station (BS) 102 in the MBS communication system 100 for managing broadcasting of the one or more MBS services to the UEs 104, according to embodiments as disclosed herein. The BS 102 includes a memory 202, an interface 204, and a processing circuity 206. The BS 102 may also include at least one of, at least one antenna, at least one RF transceiver, a transmission processing circuitry, a reception processing circuitry, and so on (not shown).

The memory 202 stores at least one of, but is not limited to, the SIB1, the MBS SIB, the MBS control and configuration information, and the MBS traffic information corresponding to the one or more MBS services, the configured RRC state of the UE 104 for each of the MBS services, the BWPs/CFRs, the DRX configurations, and so on. Examples of the memory 202 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. The memory 202 may also include one or more computer-readable storage media. The memory 202 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered a non-transitory storage medium. The term "non-transitory" may indicate that the storage medium is not embodied in a carrier wave or a propagated signal. However, the term "non-transitory" should not be interpreted to mean that the memory 202 is non-movable. In some examples, the memory 202 can be configured to store larger amounts of information than the memory. In certain examples, a non-transitory storage medium may store data that can, over time, change (e.g., in Random Access Memory (RAM) or cache).

The interface 204 may be configured to enable the BS 102 to communicate with the UEs 104 through an interface. Examples of the interface may be, but are not limited to, a wired or wireless fronthaul interface, a wired or wireless backhaul interface, or any other structure supporting communications over a wired or wireless connection. The interface 204 can be defined as a transceiver.

The processing circuitry 206 includes at least one of, a single processer, a plurality of processors, a controller, multiple homogeneous or heterogeneous cores, multiple Central Processing Units (CPUs) of different kinds, microcontrollers, special media, and other accelerators. The processing circuitry 206 may be configured to manage broadcast of the one or more MBS services to the UE 104. The processing circuitry 206 performs an operation of the BS 102 described a plurality of embodiment of the disclosure.

In an embodiment, the processing circuitry 206 enables the BS 102 to use the hierarchical signaling approach to provide the one or more MBS services to the UEs 104. The hierarchical signaling approach includes broadcasting:
  the first message/SIB1 including the scheduling information of the MBS SIB to the UEs 104 for the reception of the MBS SIB;
  the second message/MBS SIB including the configuration information of the third/MCCH message to the UEs 104 for the reception of the third/MCCH message. The third/MCCH message includes the MBS control and configuration information corresponding to the one or more MBS services;
  the third message/MCCH message to the UEs 104 over the one or more MCCHs, for the reception of the fourth/MTCH message; and
  the fourth/MTCH message including the one or more MBS services to the UEs 104 over the one or more MTCHs, wherein the one or more MBS services may vary with the latency and reliability requirements.

In an embodiment, the processing circuitry 206 may be configured to employ the plurality of MCCHs to provide the different MBS control and configuration information to the UE 104. The processing circuitry 206 maps the plurality of different MBS services to the plurality of different MCCHs, based on the latency and reliability requirements of each of the plurality of MBS services. The processing circuitry 206 broadcasts the different MBS control and configuration information corresponding to the plurality of MBS services to the UEs 104 over the mapped plurality of different MCCHs.

In an embodiment, the processing circuitry 206 may be configured to provide the one or more MBS services to the UE 104 based on the specific RRC state of the UE 104. The processing circuitry 206 configures the applicable RRC state of the UE 104 for each of the one or more MBS services. The processing circuitry 206 maintains information about the configured RRC state with each of the one or more MBS services in the memory 202.

The processing circuitry 206 reserves the availability of the one or more MBS services configured for the specific RRC state of the UE 104. The processing circuitry 206 provides the UE 104 with the MBS control and configuration information or the MBS configuration information corresponding to the one or more MBS services reserved for the UE 104 based on the applicable state or the current state of the UE 104. The processing circuitry 206 provides the MBS control and configuration information or the MBS control configuration to the UE 104 in at least one of, the RRC signalling, the unicast signalling, the SIB1, the MBS SIB, the one or more MCCHs, and so on, based on the current state of the UE 104.

In an embodiment, the processing circuitry 206 may be configured to provide the one or more MBS services to the UE 104 by managing the resource allocation. The processing circuitry 206 divides the transmission frequency of the one or more MBS services into the plurality of BWFs/CFRs. The processing circuitry 206 provides the one or more MBS services to the UE 104 based on the plurality of BWFs/CFRs. In an example, the processing circuitry 206 provides the same MBS service supported by the one or more BWPs/CRFs or the different MBS services supported by the plurality of different BWPs to the UE 104. In another example, the processing circuitry 206 dynamically allocates the PRBs over at least one of, the BWP and the CFR to provide the one or more MBS services to the UE 104 at each scheduling occasion using the PDCCH.

In an embodiment, the processing circuitry 206 may be configured to perform the group scheduling of the plurality of MBS services. The processing circuitry 206 groups the plurality of MBS services into one or more groups. The processing circuitry 206 configures the group scheduling for each of the groups. On configuring the group scheduling for each group, the processing circuitry 206 identifies the group scheduling configured for each group using the identifier.

In an embodiment, the processing circuitry 206 may be configured to provide the DRX configurations to the UE 104 in the MCCH message over the one or more MCCHs for receiving the one or more MBS services accordingly. In another embodiment, the MCCH message may include the list of MBS services, and each service is related to the index of each of the pre-defined DRX configurations.

In another embodiment, the processing circuitry 206 groups the plurality of MBS services into the one or more groups and associates the DRX configurations for each group of MBS services. The processing circuitry 206 indicates the UE 104 about the DRX configurations associated with each group of MBS services in the MCCH message over the at least one MCCH.

In an embodiment, the processing circuitry 206 may be configured to vary the transmission area for the one or more MBS services across the cell, so that the UE 104 may receive the one or more MBS services continuously, on moving from one cell to another. The processing circuitry 206 varies the transmission area for the one or more services based on the factors such as, but are not limited to, a type, a nature, and service requirements of the one or more MBS services, an input received from the UE 104 depicting the one or more MBS services the UE 104 is interested in, and so on. The processing circuitry 206 indicates the transmission area for the one or more MBS services to the UE 104 through at least one of, the SIB1, the MBS SIB, the new SIB, the MCCH and the dedicated RRC signalling message.

FIG. 2 shows exemplary elements of the BS 102, but it is to be understood that other embodiments are not limited thereon. In other embodiments, the BS 102 may include less or a greater number of elements/units. Further, the labels or names of the units are used only for illustrative purpose and does not limit the scope of the embodiments herein. One or more units can be combined together to perform same or substantially similar function in the BS 102.

Figure 3:
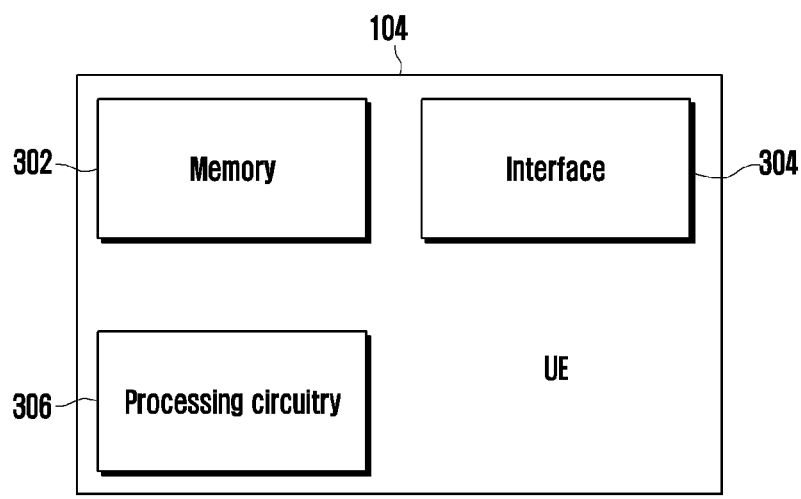
FIG. 3 is an example block diagram depicting various components of a User Equipment (UE) in the MBS communication system for managing reception of the one or more MBS services, according to embodiments as disclosed herein.

FIG. 3 is an example block diagram depicting various components of the UE 104 in the MBS communication system 100 for managing reception of the one or more MBS services, according to embodiments as disclosed herein. The UE 204 includes a memory 302, an interface 304, and a processing circuity 306. The UE 104 may also include at least one of, at least one antenna, at least one RF transceiver coupled with the processing circuitry 306, a transmission processing circuitry, a reception processing circuitry, and so on (not shown).

The memory 302 stores at least one of, the SIB, the MBS SIB, the MBS control and configuration information, the MBS traffic information, the MBS services, the DRX configurations, and so on. Examples of the memory 302 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. The memory 302 may also include one or more computer-readable storage media. The memory 302 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory 302 is non-movable. In some examples, the memory 302 can be configured to store larger amounts of information than the memory. In certain examples, a non-transitory storage medium may store data that can, over time, change (e.g., in Random Access Memory (RAM) or cache).

The interface 304 may be configured to enable the UE 104 to communicate with the BS 102 through an interface. Examples of the interface may be, but are not limited to, a wired or wireless fronthaul interface, a wired or wireless backhaul interface, or any other structure supporting communications over a wired or wireless connection. The interface 304 can be defined as a transceiver.

The processing circuitry 306 includes at least one of, a single processer, a plurality of processors, a controller, multiple homogeneous or heterogeneous cores, multiple Central Processing Units (CPUs) of different kinds, microcontrollers, special media, and other accelerators. The processing circuitry 306 performs an operation of the UE 104 described a plurality of embodiment of the disclosure.

In an embodiment, the processing circuitry 306 may be configured to receive the one or more MBS services from the BS 102, which have been varying with the latency and reliability requirements. For receiving the one or more MBS services, the processing circuitry 306 receives (for example, via the interface 304):

- the first message/SIB1 including the scheduling information of the MBS SIB from the BS 102;
- the second message/MBS SIB including the configuration information of the third/MCCH message from the BS 102 based on the scheduling information present in the first message/SIB1;
- the third message/MCCH message including the MBS control and configuration information corresponding to the one or more MBS services from the BS 102 over the one or more MCCHs, based on the configuration information present in the second message/MBS SIB;
- the fourth/MTCH message including the one or more MBS services from the BS 102 over the one or more MCCHs, based on the MBS control and configuration information present in the third message.

In an embodiment, the processing circuitry 306 may be configured to receive the different MBS control and configuration information corresponding to the plurality of different MBS services from the BS 102 over the plurality of different MCCHs. The processing circuitry 306 uses the received different MBS control and configuration information to receive the plurality of different MBS services over the one or more MTCHs.

In an embodiment, the processing circuitry 306 may be configured to receive the one or more MBS services from the BS 102 based on the current RRC state of the UE 104. For receiving the one or more MBS services, the processing circuitry 306 determines the reserved availability of the one or more MBS services for the current state of the UE 104. The processing circuitry 306 receives the MBS control and configuration information or the MBS configuration information corresponding to the reserved one or more MBS services from the BS 102, in at least one of, the RRC signalling, the unicast signalling, the SIB1, the MBS SIB, the one or more MCCHs, and so on, based on the current RRC state of the UE 104. The processing circuitry 306 uses the received MBS control and configuration information to receive the respective one or more MBS services over the one or more MTCHs.

In an embodiment, the processing circuitry 306 may be configured to receive the one or more MBS services from the BS 102 utilizing the one or more BWFs/CFRs. In an example, the processing circuitry 306 receives the same MBS service supported by the one or more BWPs/CRFs or the different MBS services supported by the plurality of different BWPs from the BS 102. In another example, the processing circuitry 306 receives the one or more MBS services from the BS 102 at each scheduling occasion using the PDCCH, on the BS 102 allocating the PRBs over at least one of, the BWP and the CFR.

In an embodiment, the processing circuitry 306 may be configured to receive the signaling from the BS 102 on the group scheduling of the one or more MBS services.

In an embodiment, the processing circuitry 306 may be configured to receive the DRX configurations from the BS 102 in the MCCH message over the one or more MCCHs. In another embodiment, the MCCH message may include the list of MBS services, and each service is related to the index of each of the pre-defined DRX configurations. Alternatively, the processing circuitry 306 may receive the DRX configurations associated with each group of MBS services in the MCCH message over the at least one MCCH.

The processing circuitry 306 uses the DRX configurations to enable the UE 104 to turn ON for receiving the one or more MBS services and to turn OFF, after receiving the one or more MBS services.

In an embodiment, the processing circuitry 306 may be configured to provide the input to the BS 102 depicting the one or more MBS services the UE 104 is interested in, so that the BS 102 may vary the transmission area for the corresponding one or more MBS services. The processing circuitry 306 utilizes one of, a UE assistance information message, and an MBS interest indication message to indicate to the BS 102 the required transmission area. On varying the transmission area for the corresponding one or more MBS services, the processing circuitry 306 continues the reception of the one or more MBS services, on the UE 104 moving from one cell to another cell. The processing circuitry 306 receives the indication for the transmission area for the one or more MBS services through at least one of, the SIB1, the MBS SIB, the new SIB, the MCCH and the dedicated RRC signalling message.

FIG. 3 shows exemplary elements of the UE 104, but it is to be understood that other embodiments are not limited thereon. In other embodiments, the UE 104 may include less or a greater number of elements/units. Further, the labels or names of the units are used only for illustrative purpose and does not limit the scope of the embodiments herein. One or more units can be combined together to perform same or substantially similar function in the UE 104.

Figure 4:
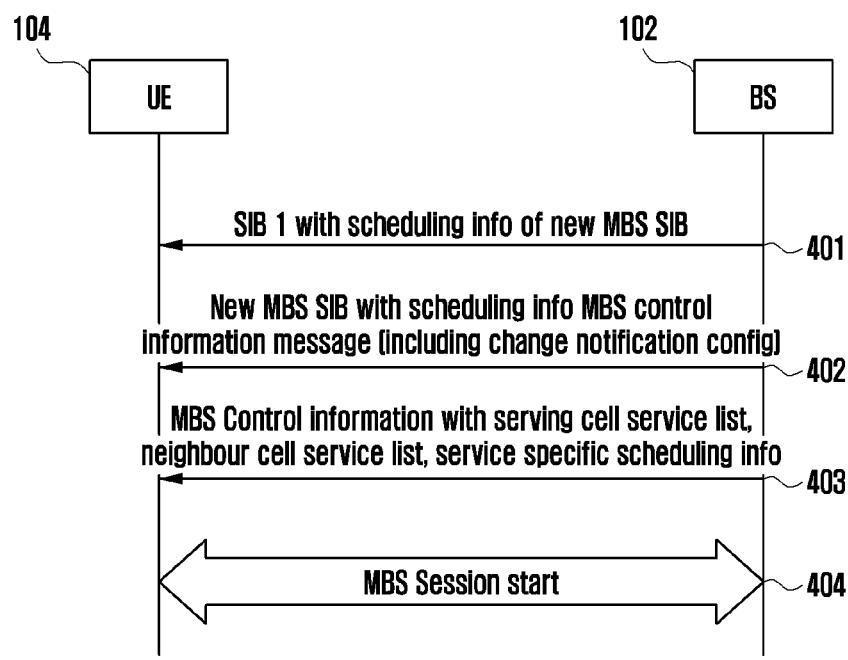
FIG. 4 is an example sequence diagram depicting a hierarchical signaling approach used to provide the one or more MBS services to the UE, according to embodiments as disclosed herein.

FIG. 4 is an example sequence diagram depicting the hierarchical signaling approach used to provide the one or more MBS services to the UE 104, according to embodiments as disclosed herein.

At step 401, the UE 104 receives the SIB1 with the scheduling information of the MBS SIB from the BS 102. At step 402, the UE 104 receives the MBS SIB from the BS 102, based on the scheduling information of the MBS SIB present in the received SIB1. The MBS SIB includes the configuration information of the MCCH message and a change notification configuration. The change notification configuration includes notification of start of a new MBS service, modification of the configuration of the MBS service, stop of the ongoing MBS service, and so on.

At step 403, the UE 104 receives the MCCH message from the BS 102 over the MCCH, based on the configuration information present in the received MBS SIB. The MBS control and configuration information message/MCCH message includes the MBS control and configuration information corresponding to the one or more MBS services, a serving cell service list, a neighbor cell service list, service specific scheduling information, or the like.

At step 404 initiates the MBS session with the UE 104 and provides the one or more MBS services to the UE 104. The UE 104 receives the one or more MBS services from the BS 102 over the MTCH, based on the MBS control and configuration information present in the MCCH message.

Figure 5:
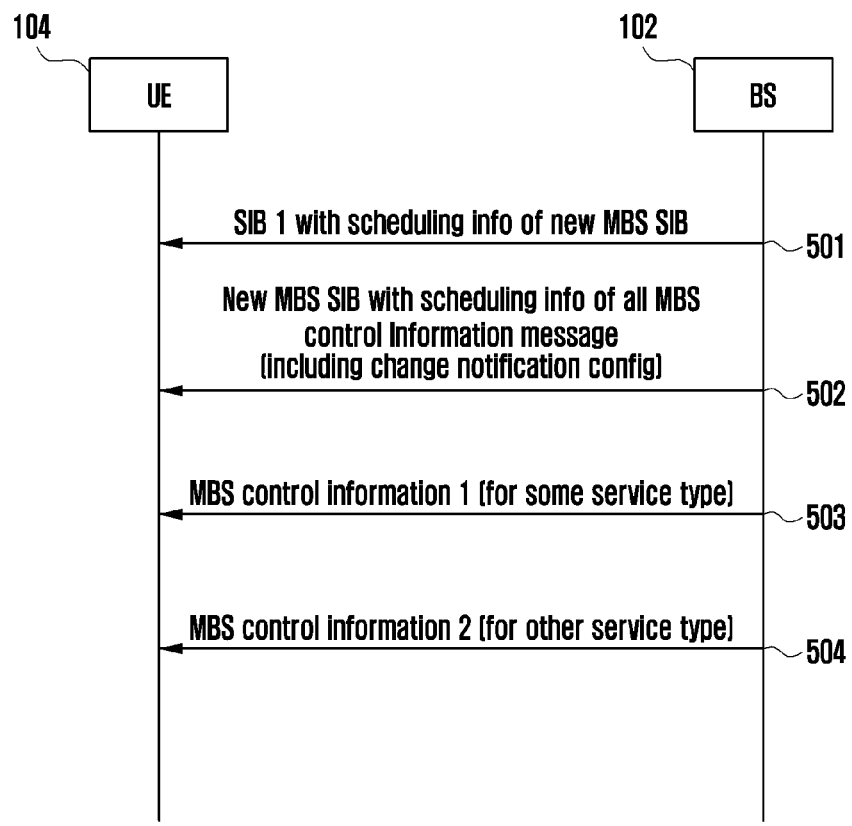
FIG. 5 is an example sequence diagram depicting usage of a plurality of different MBS control channels (MCCHs) to provide different MBS control and configuration information to the UE, according to embodiments as disclosed herein.

FIG. 5 is an example sequence diagram depicting the usage of the plurality of different MCCHs to provide the different MBS control and configuration information to the UE 104, according to embodiments as disclosed herein.

At step 501, the UE 104 receives the SIB1 with the scheduling information of the MBS SIB from the BS 102. At step 502, the UE 104 receives the MBS SIB from the BS 102, based on the scheduling information of the MBS SIB present in the received SIB1. The MBS SIB includes the configuration information of the MCCH message and the change notification configuration.

At step 503, the UE 104 receives a first MBS control and configuration information corresponding to a first set of MBS services from the BS 102 over a first MCCH. At step 504, the UE 104 receives a second MBS control and configuration information corresponding to a second set of MBS services from the BS 102 over a second MCCH. The UE 104 uses the first MBS control and configuration information and the second MBS control and configuration information to receive the first MBS information and the second MBS information, respectively over the one or more MTCHs. Thus, the different MBS control and configuration information corresponding to the different MBS services may be received over the different MCCHs.

Figure 6:
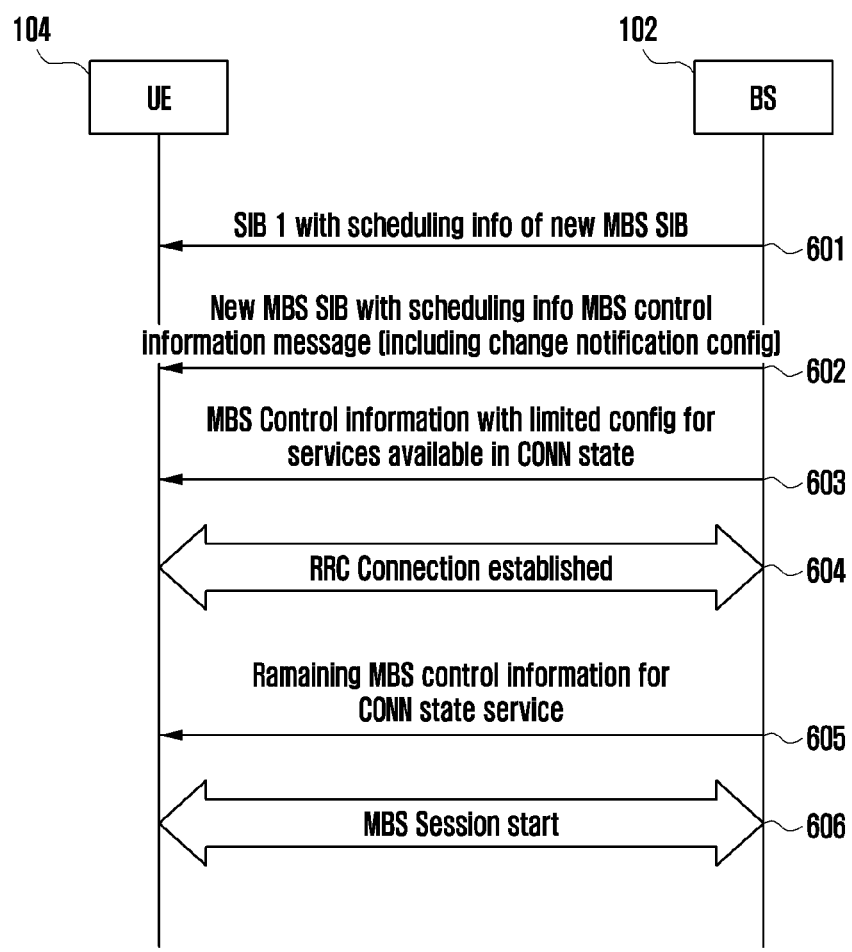
FIG. 6 is an example sequence diagram depicting providing of the MBS control and configuration information to the UE based on a Radio Resource Control (RRC) state of the UE, according to embodiments as disclosed herein.

FIG. 6 is an example sequence diagram depicting providing of the MBS control and configuration information to the UE 104 based on the RRC state of the UE 104, according to embodiments as disclosed herein.

At step 601, the UE 104 receives the SIB1 with the scheduling information of the MBS SIB from the BS 102. At step 602, the UE 104 receives the MBS SIB from the BS 102, based on the scheduling information of the MBS SIB present in the received SIB1. The MBS SIB includes the configuration information of the MCCH message and the change notification configuration.

At step 603, the UE 104 receives the MBS control and configuration information in the MCCH message from the BS 102, wherein the MBS control and configuration information corresponds to the one or more MBS services whose availability have been reserved for the RRC Connected state of the UE 104.

At step 604, the UE 104 establishes an RRC connection with the BS 102 and enters the RRC Connected state. On entering the RRC Connected state, at step 605, the UE 104 receives the remaining MBS control and configuration information corresponding to the one or more MBS services whose availability have been reserved for the RRC Connected state of the UE 104.

At step 606, the BS 102 initiates the MBS session with the UE 104 and provides the one or more MBS services to the UE 104. The UE 104 uses the received MBS control and configuration information to receive the one or more MBS services configured and reserved for the RRC Connected state.

The embodiments disclosed herein can be implemented through at least one software program running on at least one hardware device and performing network management functions to control the elements. The elements shown in FIGS. 1-3 can be at least one of a hardware device, or a combination of hardware device and software module.

The embodiments disclosed herein describe methods and systems for managing Multicast Broadcast Service (MBS) services. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. A method for managing multicast broadcast service (MBS) services performed by a terminal, the method comprising:

receiving a first message including scheduling information of a second message from a base station;

receiving the second message including configuration information of a third message from the BS based on the scheduling information included in the first message;

receiving the third message including MBS control and configuration information of at least one MBS service from the BS over at least one MBS control channel (MCCH) based on the configuration information included in the second message; and receiving a fourth message including the at least one MBS service from the BS over at least one MBS traffic channel (MTCH) based on the MBS control and configuration information included in the third message, wherein each of the at least one MBS service is based on latency and reliability requirements.

2. The method of claim 1, wherein the first message is a system information block 1 (SIB1);

wherein the second message is one of an MBS SIB or an extended SIB1;

wherein each of the at least one MCCH has different configuration parameters, and wherein the configuration parameters include at least one of, a repetition period, a modification period, a first slot, a duration, a bandwidth part (BWP), a common frequency resource (CFR), discontinuous reception (DRX) configurations, a radio network temporary identifier (RNTI), a beamforming configuration or a modulation and coding scheme.

3. The method of claim 1, further comprising:

receiving, from the BS, different MBS control and configuration information corresponding to a plurality of MBS services on a plurality of different MCCHs, wherein the plurality of MBS services are mapped to the plurality of different MCCHs; and receiving, from the BS, a plurality of different MBS services over a plurality of MTCHs, based on the received different MBS control and configuration information.

4. The method of claim 1, further comprising:

receiving, from the BS, the MBS control and configuration information corresponding to the at least one MBS service configured with an applicable radio resource control (RRC) state of a user equipment (UE), wherein the RRC state of the UE includes one of an RRC connected state, an RRC inactive state, or an RRC idle state; and receiving, from the BS, the at least one MBS service configured with the applicable RRC state over the at least one MTCH, based on the received MBS control and configuration information.

5. The method of claim 4, further comprising:

determining reserved availability of the at least one MBS service configured for the RRC connected state based on at least one of the latency and reliability requirements, or an acknowledgement mode of operation, when the UE is in the RRC connected state; and receiving, from the BS, MBS configuration information corresponding to a reserved at least one MBS service in the RRC connected state through an RRC signalling or a unicast signalling;

determining the reserved availability of the at least one MBS service configured for the RRC idle state or the RRC inactive state based on the latency and reliability requirements, when the UE is in the RRC idle state or the RRC inactive state; and receiving, from the BS, the MBS configuration information corresponding to a reserved at least one MBS service in the RRC idle state or the RRC inactive state through a broadcast signalling.

6. The method of claim 1, further comprising:

receiving, from the BS, the at least one MBS service using a plurality of bandwidth parts (BWPs).

7. The method of claim 1, further comprising:

receiving, from the BS, a discontinuous reception (DRX) configuration using the third message over the at least one MCCH.

8. The method of claim 7, wherein a common DRX occasion is configured for at least one session of the at least one MBS service based on the DRX configuration.

9. A terminal for managing multicast broadcast service (MBS) services in a wireless communication system, the terminal comprising:

a transceiver; and at least one processor configured to:

receive, from a base station (BS) via the transceiver, a first message including scheduling information of a second message, receive, from the BS via the transceiver, the second message including configuration information of a third message based on the scheduling information included in the first message, receive, from the BS via the transceiver, the third message including MBS control and configuration information of at least one MBS service over at least one MBS control channel (MCCH) based on the configuration information included in the second message, and receive, from the BS via the transceiver, a fourth message including the at least one MBS service over at least one MBS traffic channel (MTCH) based on the MBS control and configuration information included in the third message, wherein each of the at least one MBS service is based on latency and reliability requirements.

10. The terminal of claim 9, wherein the first message is a system information block 1 (SIB1);

wherein the second message is one of an MBS SIB or an extended SIB1;

wherein each of the at least one MCCH has different configuration parameters, and wherein the configuration parameters include at least one of, a repetition period, a modification period, a first slot, a duration, a bandwidth part (BWP), a common frequency resource (CFR), discontinuous reception (DRX) configurations, a radio network temporary identifier (RNTI), a beamforming configuration or a modulation and coding scheme.

11. The terminal of claim 9, wherein the at least one processor is further configured to:

receive, from the BS via the transceiver, different MBS control and configuration information corresponding to a plurality of MBS services on a plurality of different MCCHs, wherein the plurality of MBS services are mapped to the plurality of different MCCHs, and receive, from the BS via the transceiver, a plurality of different MBS services over a plurality of MTCHs, based on the received different MBS control and configuration information.

12. The terminal of claim 9, wherein the at least one processor is further configured to:

receive, from the BS via the transceiver, the MBS control and configuration information corresponding to the at least one MBS service configured with an applicable radio resource control (RRC) state of a user equipment UE, wherein the RRC state of the UE includes one of an RRC connected state, an RRC inactive state, or an RRC idle state, and receive, from the BS via the transceiver, the at least one MBS service configured with the applicable RRC state over the at least one MTCH, based on the received MBS control and configuration information.

13. The terminal of claim 12, wherein the at least one processor is further configured to:

determine reserved availability of the at least one MBS service configured for the RRC connected state based on at least one of the latency and reliability requirements, or an acknowledgement mode of operation, when the UE is in the RRC connected state, and receive, from the BS via the transceiver, MBS configuration information corresponding to a reserved at least one MBS service in the RRC connected state through an RRC signalling or a unicast signalling; and determine the reserved availability of the at least one MBS service configured for the RRC idle state or the RRC inactive state based on the latency and reliability requirements, when the UE is in the RRC idle state or the RRC inactive state, and receive, from the BS via the transceiver, the MBS configuration information corresponding to a reserved at least one MBS service in the RRC idle state or the RRC inactive state through a broadcast signalling.

14. The terminal of claim 9, wherein the at least one processor is further configured to:

receive, from the BS via the transceiver, the at least one MBS service using a plurality of bandwidth parts (BWPs).

15. The terminal of claim 9, further comprising:

receive, from the BS via the transceiver, a discontinuous reception (DRX) configuration using the third message over the at least one MCCH, wherein a common DRX occasion is configured for at least one session of the at least one MBS service based on the DRX configuration.

* * * * *